United States Patent [19]
Brantley, Jr.

[11] 3,977,197
[45] Aug. 31, 1976

[54] THERMAL ENERGY STORAGE SYSTEM

[75] Inventor: Lott W. Brantley, Jr., Union Grove, Ala.

[73] Assignee: The United States of America as represented by the United States National Aeronautics and Space Administration, Washington, D.C.

[22] Filed: Aug. 7, 1975

[21] Appl. No.: 602,618

[52] U.S. Cl. .................................. 60/659; 165/10
[51] Int. Cl.² ........................................ F01K 3/00
[58] Field of Search ................. 165/10; 60/659, 641

[56] References Cited
UNITED STATES PATENTS 2,933,885  4/1960  Benedek et al. ...................... 60/659

Primary Examiner—Allen M. Ostrager
Attorney, Agent, or Firm—L. D. Wofford, Jr.; Gary F. Grafel; John R. Manning

[57] ABSTRACT

A thermal energy storage system for converting a fluid such as water, into a superheated vapor for driving a turbine includes an energy storage device for storing thermal energy from the vapor to be utilized should the pressure of the vapor fall below a predetermined value. The energy storage device includes a storage tank having a plurality of stacked vertical compartments containing metallic spheres filled with metal alloy for storing the thermal energy therein and a fluid reservoir below the stacked compartments.

8 Claims, 2 Drawing Figures

3,977,197

THERMAL ENERGY STORAGE SYSTEM

ORIGIN OF THE INVENTION

The invention described herein was made by an employee of the United States Government and may be manufactured or used by or for the Government for governmental purposes without the payment of any royalties thereon or therefor.

BACKGROUND OF THE INVENTION

This invention relates to a thermal energy storage system and more particularly to a storage tank device which stores the thermal energy from a super heated vapor to be utilized in the system should the pressure of the vapor fall below a predetermined value.

Heretofore, storage tanks have been utilized for storing a heated fluid for subsequent use in an energy generating system and the like. However, it has been found that by transferring the thermal energy from the heated fluid or vapor to another medium such as the metallic spheres of the present invention, the thermal energy may be stored in a more efficient manner.

SUMMARY OF THE INVENTION

The invention includes an energy storage device for use in an energy storage and conversion system having a boiler for heating a fluid flowing therethrough and converting the fluid into a superheated vapor, conduit means for delivering the vapor to a turbine for driving the turbine, a generator driven by the turbine for generating electricity, a by-pass conduit for delivering part of the vapor to and from the energy storage device, regulator means for regulating the pressure of the vapor delivered to the turbine while regulating the delivery of vapor to and from the energy storage device, condensor means for converting the vapor exiting the turbine into a cool fluid, and pump means for returning cooled fluid to the boiler while delivering part of the fluid to the energy storage device.

The energy storage device comprises a vertical storage tank having an inlet opening formed in a top thereof connected to the by-pass conduit means. A plurality of stacked vertical compartments is formed within said tank so as to be interconnected with each other. A reservoir formed within said storage tank beneath said stacked compartments is provided for storing fluid condensing from said vapor. The stacked compartments and the reservoir are interconnected so that vapor entering the inlet opening passes downwardly therethrough progressively heating the compartments and condensing into a heated fluid for storage in the reservoir. Thus, thermal energy is effectively stored and may be removed when needed to drive the turbine.

Accordingly, it is an important object of the present invention to provide an efficient energy storage device for storing thermal energy from a heated fluid or vapor.

Another important object of the present invention is to provide an energy storage device wherein thermal energy from a heated fluid or vapor is utilized to convert a metallic alloy from a solid to a liquid for effectively storing thermal energy therein.

Still another important object of the present invention is to provide a solar energy system in which thermal energy is effectively stored for driving a turbine should the pressure in the system fall below a predetermined value.

These and other objects and advantages of the invention will become apparent upon reference to the following specification, attendant claims and drawing.

DESCRIPTION OF A PREFERRED EMBODIMENT

This invention relates to an energy storage system which utilizes any suitable fluid such as water and vapor and more particularly to a device which will store thermal energy from the superheated vapor.

Figure 1:
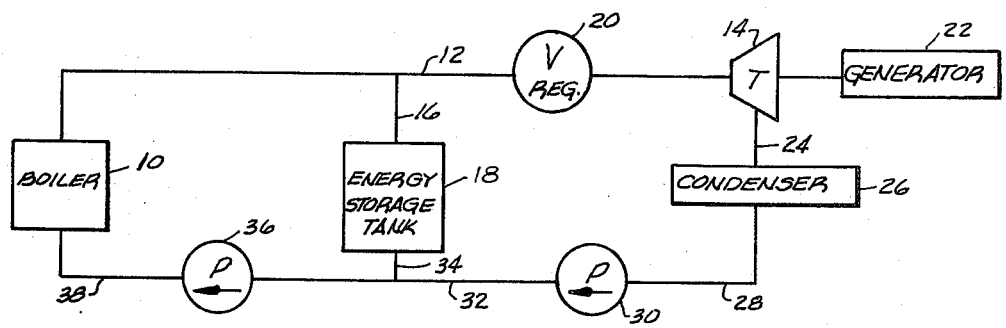
FIG. 1 is a schematic diagram illustrating an energy storage system utilizing an energy storage device constructed in accordance with the present invention.

Referring in more detail to FIG. 1 of the drawing, a suitable system is disclosed therein in which the energy storage device of the present invention may be utilized. The system includes a boiler 10 which may be any suitable device such as a solar energy absorber for heating the fluid in the system by means of solar energy. Although any suitable fluid may be utilized in the system, the system and storage device of the present invention will be described utilizing water for purposes of illustration. As the water flows through the boiler 10, the water boils and superheated vapor is produced therefrom. The superheated water and vapor flows out of the boiler through the conduit 12 to a conventional turbine 14. Part of the water and vapor flows through a by-pass conduit 16 into an energy storage device 18 for storing the thermal energy from the superheated vapor therein. The pressure of vapor in the conduit 12 is regulated by a pressure regulator valve 20. In one particular example the pressure in the conduit 12 is regulated to approximately 1900 psi.

The pressurized water which will normally be in the form of steam or superheated vapor rotates the turbine 14 which is operatively connected to a conventional generator 22 for converting the rotation of the turbine into electrical energy. The thermal energy stored in the storage device 18 provides pressurized steam to the turbine 14 only when the incoming steam through conduit 12 falls below the regulated pressure of the valve 20, or 1900 psi. As long as the incoming pressure in conduit 12 is above approximately 1900 psi, the boiler 10 will operate the turbine directly.

A conduit 24 is connected to an exhaust outlet of the turbine 14 for delivering the exhaust through a condensor 26 which may be of the conventional radiator type. As the exhausted steam flows through the radiator, it is cooled and condensed into water. The water is delivered through a conduit 28 to the vacuum side of a conventional pump 30 which raises the pressure of the water to somewhere in the range of 1900 to 2500 psi. The pressure or output side of the pump 30 is connected by way of a conduit 32 to a conduit 34 which extends into the bottom of the energy storage tank 18. The conduit 32 is also connected to an input side of a transfer pump 36 which pumps the water back to the boiler 10 through a conduit 38. Thus, the energy storage system is a closed-loop system.

Figure 2:
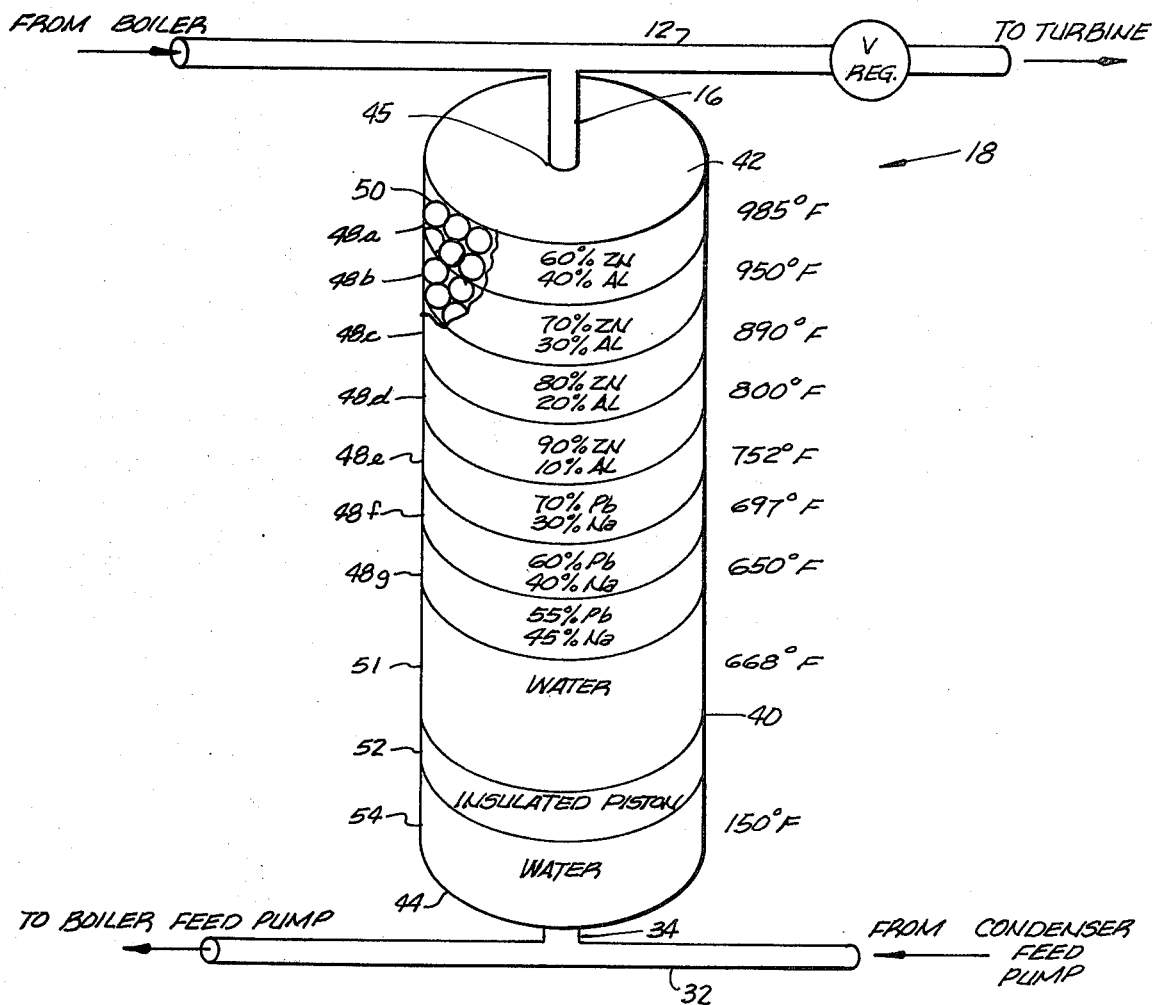
FIG. 2 is a schematic diagram illustrating an energy storage device constructed in accordance with the present invention.

Referring now to FIG. 2, there is illustrated in more detail the energy storage tank 18. The energy storage tank 18 is constructed in the form of a vertical cylinder having side walls 40 with an adjoining top 42 and bottom 44. The by-pass conduit 16 extends into an inlet opening 45 formed in the top portion 42 of the energy storage tank. The previously mentioned conduit 34 extends into the bottom portion of the storage tank 18 through bottom 44 thereof.

The storage tank 18 is divided into a plurality of vertically stacked compartments 48a through 48g, each of which is insulated so as to retain heat therein. The insulation may be any suitable insulating material capable of withstanding high temperatures. Each of the stacked compartments 48a through 48g has an opening communicating with each adjacent compartment through which the water passes and percolates through each compartment and exits through a subsequent opening to the adjacent compartment. It is to be understood that rather than using openings formed in the top and bottom of adjacent compartments for joining the stacked compartments, a conduit may be utilized to join the respective tops and bottoms of adjacent compartments with spacing between the adjacent compartments.

Each of the compartments 48a through 48g is constructed so as to store thermal energy at a different temperature. An exemplary temperature gradient is shown in FIG. 2 as decreasing from the top to the lower compartments. This temperature gradient is accomplished by placing within each compartment a plurality of metallic spheres 50 which include a metal shell capable of retaining alloys such as zinc aluminum alloys and lead sodium alloys. The exact proportions of these alloys vary according to the desired temperature for each compartment and the application for which the storage system is used.

As the superheated steam or vapor flows through the compartment 48a it impinges upon the spherical bodies 50 contained therein causing, for example, the zinc alloy therein to be changed from a solid state to a liquid state storing the thermal energy therein. The ratio between the zinc and aluminum varies between the adjacent compartments 48a through 48g so that as the steam loses its heat or thermal energy as it progresses through each subsequent compartment, the heat at each compartment is sufficient for converting the particular alloy composition in that compartment from a solid state to a liquid state. Thus, in order to convert the zinc aluminum alloy in the first compartment 48a from a solid state to a liquid state, it must be heated to approximately 985°. The metallic spheres 50 in the adjacent compartment 48b change from a solid to a liquid at approximately 950°, and the heat required to convert the alloy composition in each subsequent compartment decreases progressively. As can be seen in the drawing, the spheres in the first compartment 48a contain approximately 60% zinc and 40% aluminum, the spheres in compartment 48b contains 70% zinc and 30% aluminum; spheres in compartment 48c contain approximately 80% zinc and 20% aluminum, and the spheres in compartment 48d contain 90% zinc and 10% aluminum. Beginning with compartment 48e a lead sodium alloy is utilized so as to be converted from a solid state to a liquid state at the lower temperatures at which the steam exists in the lower compartments. In compartment 48e the spheres therein contain approximately 70% lead and 30% sodium, in compartment 48f the spheres contain approximately 60% lead and 40% sodium and in compartment 48g the spheres contain approximately 55% lead and 45% sodium. While a zinc aluminum alloy has been described in the spheres in compartments 48a through 48d and a lead sodium alloy has been described in the spheres in compartments 48e through 48g, it is to be understood that such is for purposes of illustration only and that other ratios may be utilized as well as other suitable metal alloys. Also, it is possible that a zinc aluminum alloy may be utilized in the spheres of all of the compartments as can be the lead sodium alloy or any other suitable metal alloy.

As the steam passes through the lowermost compartment 48g, it condenses into high temperature water and is stored in a reservoir compartment 51. Directly below the reservoir compartment 51 is an insulated piston 52 forming a bottom boundary thereof which moves up and down within the cylindrical reservoir portion of the tank according to whether water is being delivered to the reservoir or removed therefrom. During the storage phase of the system, the volume of water in the reservoir compartment 51 is increased forcing the insulated piston 52 downwardly towards the bottom 44 of the storage tank. When it is necessary to deliver thermal energy stored in the storage tank 18 to drive the turbine 14, the pressure in conduit 12 must be reduced to below approximately 1900 psi which will allow the water in reservoir compartment 51 to boil and generate steam which flows upwardly through the heated compartments 48g through 48a absorbing thermal energy therefrom, and exiting out the by-pass conduit 16 to the conduit 12 for delivery to the turbine 14. The return water from the condensor 26 is, in turn, brought back through conduit 32 up through conduit 34 into a bottom reservoir compartment 54 of the storage tank forcing the piston 52 upwardly.

While the storage tank 18 has been described in this particular environment as being a vertically extending cylindrical tank, it is to be understood that a storage tank may consist of a plurality of spherical tanks of different diameters provided within each other with the center sphere being the superheated portion corresponding to compartment 48a and the outer sphere being the lowest temperature compartment corresponding to compartment 48g. The water reservoir tank would be located below the concentric spherical compartments. Each of these spherical tanks, of course, would have to be insulated for storing the thermal energy therein. It is also to be understood that instead of using a plurality of spherical tanks, or the vertical tank 18 as shown in the drawing, separate insulated tanks could be utilized with conduit means provided therebetween for interconnecting the tanks which would operate in the same manner as the stacked compartments as described above.

Thus, it can be seen that a highly efficient storage tank device 18 is provided for storing thermal energy from a superheated vapor and the like wherein the thermal energy converts a solid metal alloy to a liquid state for storing the thermal energy therein. The thermal energy may be recovered from the metal spheres 50 and the converted liquid alloy therein when the pressure of the vapor or steam in the delivery conduit of the system falls below a predetermined or desired level. This pressure level may be regulated by the pressure regulator valve 20.

While a preferred embodiment of the invention has been described using specific terms, such description is for illustrative purposes only, and it is to be understood that changes and variations may be made without departing from the spirit or scope of the following claims.

What is claimed is:

1. An energy storage device for use in an energy storage and conversion system having a boiler for heating a fluid flowing therethrough converting the fluid into a superheated vapor, conduit means for delivering the vapor to a turbine for driving the turbine, a generator driven by said turbine for generating electricity, a by-pass conduit for delivering part of the vapor to and from said energy storage device, regulator means for regulating the pressure of the vapor delivered to the turbine while regulating the delivery of vapor to and from said energy storage device, condensor means for converting the vapor exiting the turbine into a cooled fluid, and pump means for returning said cooled fluid to said boiler while delivering part of the fluid to the energy storage device, said energy storage device comprising:
   a. a vertical storage tank having an inlet opening formed in a top thereof connected to said conduit means;
   b. a plurality of stacked vertical compartments formed within said tank so as to be interconnected with each other;
   c. a reservoir formed within said storage tank beneath said stacked compartments for storing fluid condensing from said vapor;
   d. said stacked compartments and said reservoir being interconnected so that vapor entering said inlet opening passes downwardly therethrough progressively heating said compartments and condensing into a heated fluid for storage in said reservoir;
   whereby thermal energy stored in said storage device may be removed when needed to drive said turbine.

2. The device of claim 1 further comprising a plurality of metallic spheres carried in each of said vertical compartments for contacting said heated vapor and storing thermal energy therein.

3. The device of claim 2 wherein said spheres include an outer metal shell having a metal alloy contained therein whereby thermal energy from said heated vapor changes said alloy from a solid to a liquid form for storing said thermal energy within said metallic spheres.

4. The device of claim 3 wherein the composition of said metal alloy varies between adjacent compartments so that progressively decreasing heat from said vapor is sufficient to change the alloy from a solid to a liquid in each of said compartments.

5. The device of claim 4 wherein said metal alloy is a zinc-aluminum alloy.

6. The device of claim 4 wherein said metal alloy is a lead-sodium alloy.

7. The device of claim 4 wherein said metal alloy is a zinc-aluminum alloy in adjacent upper compartments and is a lead-sodium alloy in the remaining lower adjacent compartments.

8. The device of claim 1 wherein said reservoir includes:
   a. an upper reservoir of heated water;
   b. a lower reservoir having an inlet opening connected to said condensor means for receiving cooled, condensed fluid therefrom; and
   c. an insulated piston slideably received in said reservoir separating said upper and lower reservoirs while providing a variable volume for the amounts of heated and cooled fluid received in said upper and lower reservoirs, respectively.

* * * * *